United States Patent Office 3,434,443
Patented Mar. 25, 1969

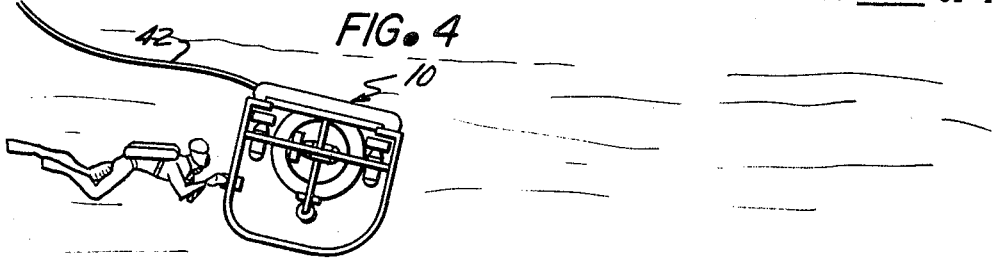
FIG. 4
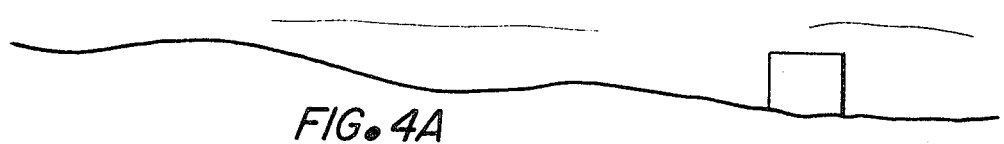
FIG. 4A
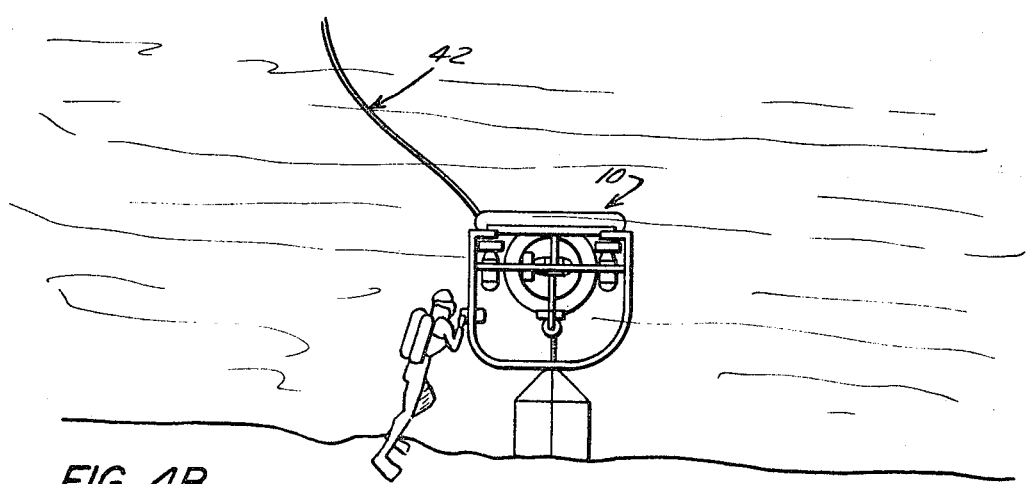
FIG. 4B
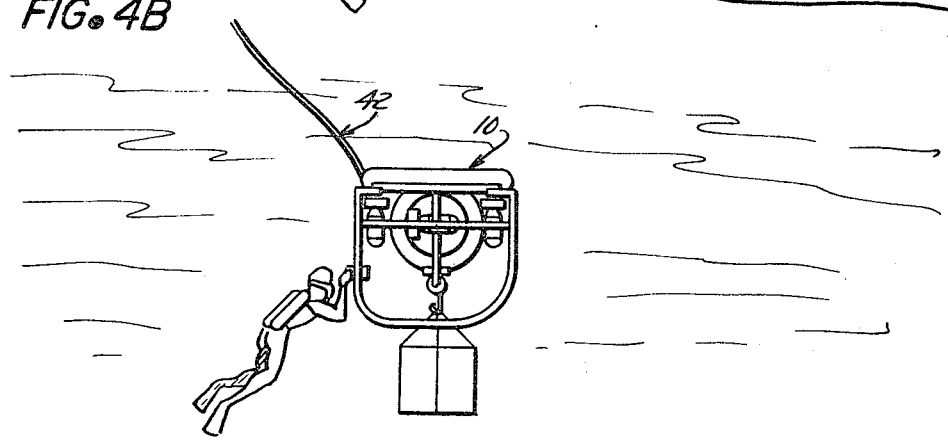

3,434,443
UNDERWATER BUOYANCY TRANSPORT
VEHICLE
Norman B. Estabrook, Pasadena, Calif., assignor to the
United States of America as represented by the Secretary of the Navy
Filed Nov. 22, 1967, Ser. No. 685,052
Int. Cl. B63c 11/46; A63b 35/12
U.S. Cl. 114—16                                              4 Claims

ABSTRACT OF THE DISCLOSURE

A load transport vehicle for use by a diver on the floor of the ocean is built around a generally spherical buoyancy container, and has means for selectively introducing gas into the container to provide buoyancy forces to lift the load. Diver controlled valving enables control of the proportion of liquid and gas in the spherical container. Fixed buoyancy tanks are provided at the top of the vehicle. The load to be transported is attached by a suspension yoke pivotally suspended from a transverse axis through the spherical container. A pair of fixed longitudinal propulsion units, and a pair of fixed vertical propulsion units enable triaxial maneuvering of the vehicle.

---

The invention described herein may be manufactured and used by or for the Government of the United States of America for governmental purposes without the payment of any royalties thereon or therefor.

Background of the invention

This invention relates to underwater vehicles and more particularly to a diver's work vehicle which employs force of buoyancy to lift another object, and is intended as a means for transporting objects from one point to another on the floor of a body of water. Such a vehicle is sometimes referred to as an Underwater Buoyancy Transport Vehicle.

The need has existed some time now for a device to assist divers in moving heavy objects from one location to another on the ocean bottom. Presently, these tasks are carried out through the use of various lines to a surface support platform and a winch. In the case of lighter loads, brute force has been employed. Both of these methods have serious drawbacks that can severely hamper an underwater task such as a salvage operation. Lines become entangled and objects must be moved blindly about by a surface operator, who cannot observe directly what he is doing on the bottom. Divers attempting to relocate heavy tools and equipment, even short distances away, quickly become exhausted, thereby reducing their gas supply and limiting their usefulness. As divers go deeper, where visibility decreases and special gas mixtures fed through tethers become necessary, these problems are even more acute.

An object is to provide an undersea diver's work vehicle capable of transporting heavy objects from one point to another on the floor of a body of water.

Another object is to provide a vehicle in accordance with the preceding objective which is easily controlled, has good response to the diver, and has inherently good stability.

Other objects and many of the attendant advantages of this invention will be readily appreciated as it becomes better understood by reference to the description and accompanying drawing which follows.

Brief description of the drawing

FIGS. 4, 4A and 4B illustrate phases in using the invention to move a load.

Description of the preferred embodiment

Figure 1:
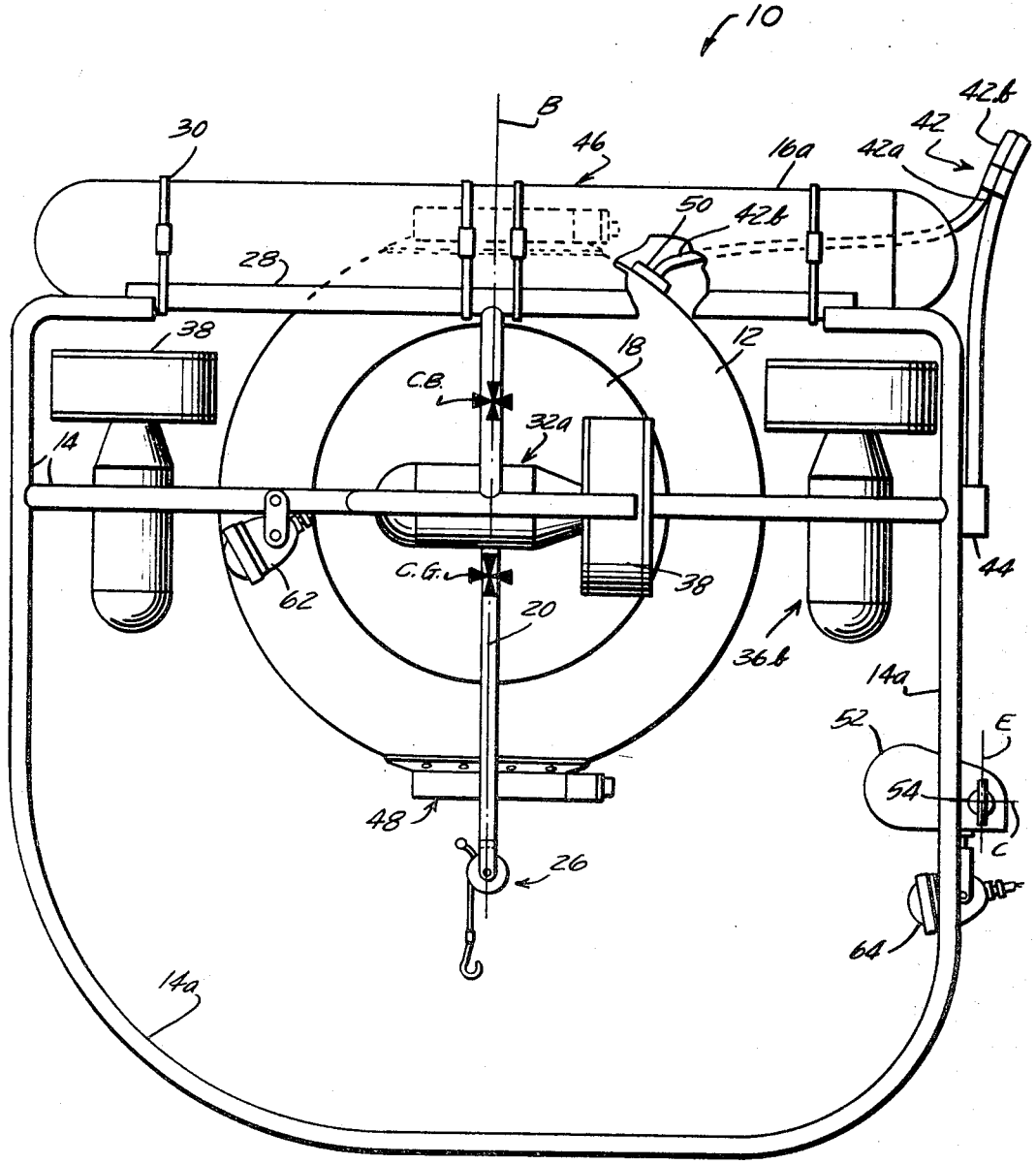
FIG. 1 is a side elevation of the subject of the invention.
Figure 2:
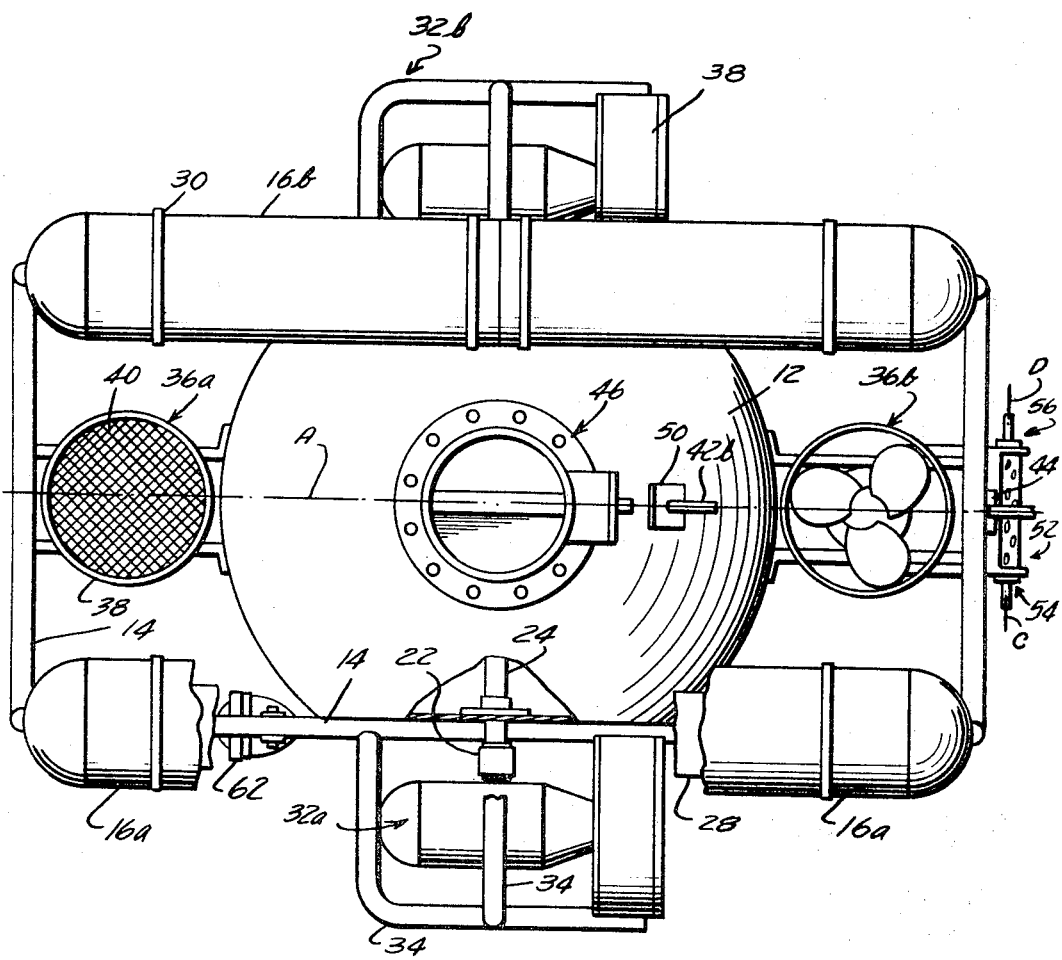
FIG. 2 is a top elevation of same.
Figure 3:
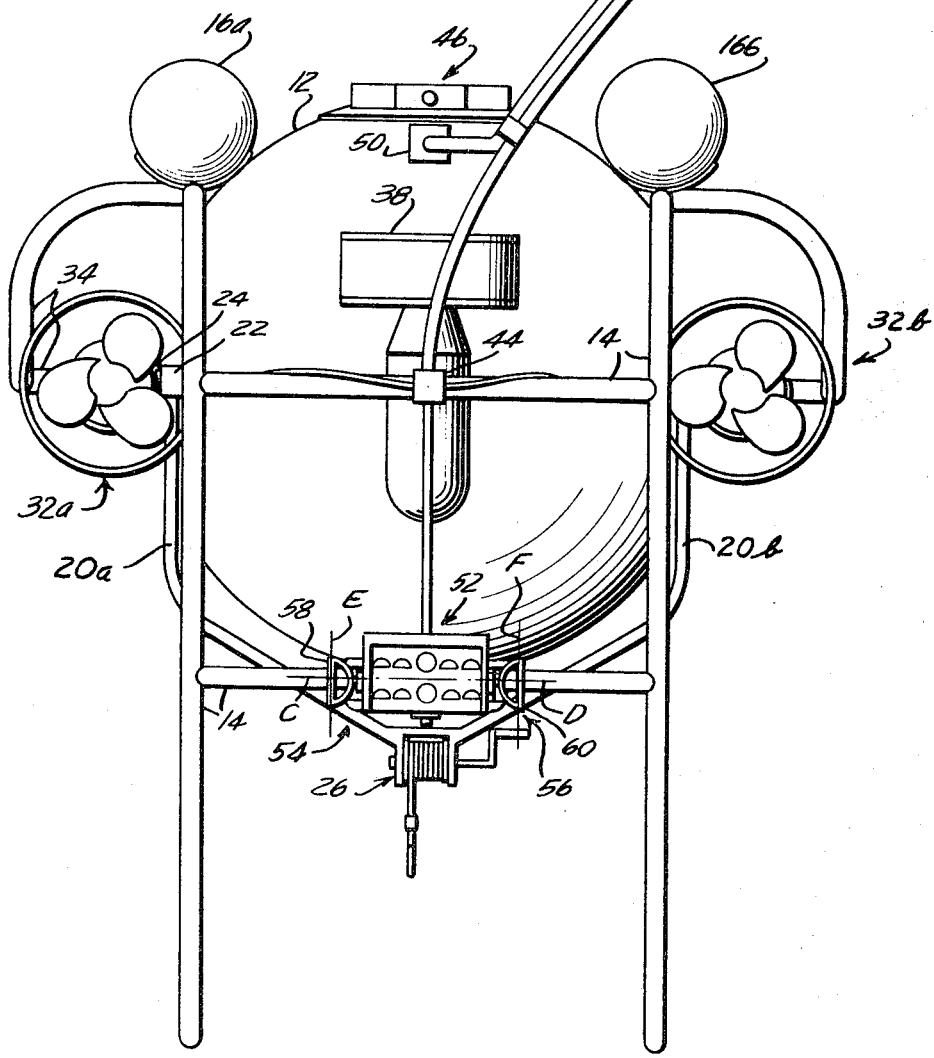
FIG. 3 is a rear elevation of same.

Referring now to FIGS. 1, 2 and 3 of the drawing, underwater buoyancy transport vehicle 10 comprises a generally spherical container 12, a support cage 14 affixed thereabout, and a pair of fixed cylindrical buoyancy tanks 16a and 16b on the top. Cage 14 is made of aluminum tubing and is rigidly affixed to spherical container 12 by brackets, not shown. The cage is generally polyhedral in shape, with its length in the direction of the vehicle longitudinal axis A greater than its width. To enhance the length to width ratio, the lateral extremities of spherical container 12 are truncated, forming circular lateral faces 18 at each side of the spherical container. A load suspension yoke 20 pivotally depends from the spherical container 12. Yoke 20 consists of a pair of arms 20a and 20b which laterally straddle container 12, and which have a pair of aligned bearing sleeves 22 affixed to their upper ends. A tubular cross member 24 extends transversely through the center of spherical container 12, with its ends projecting from the circular lateral faces 18. Bearing sleeves 22 are journaled about these projecting ends. A hand winch 26, having ratchet lock, is affixed to the lower end of suspension yoke 20. The combined capacity of tanks 16a and 16b is sufficient to displace the water equivalent to the weight of the vehcle, excepting a nominal margin of negative buoyancy. This nominal negative buoyancy enables the vehicle to rest on the bottom when not in use. Spherical container 12 is filled with air and water in varying proportions to provide just the buoyancy force needed to balance the load. The side members 14a of the support cage form the feet and skids of the vehicle. The front end of each side member is bent into a large radius arc, and clearance is left underneath spherical container 12, to allow the divers to have access to the point of attachments of the load.

Vehicle 10 has a vertical axis B extending through the center of the spherical container 12. The overall construction and arrangement is such that the center of buoyancy (C.B.) and the center of gravity (C.G.) are aligned along axis B with the center of buoyancy located a substantial distance above the center of gravity. The chief construction feature responsible for the higher center of buoyancy is the placement of the fixed buoyancy tanks 16a, 16b at the top of the spherical container. Also, wherever possible the heavier items have been mounted below the center of spherical container 12. The cylindrical buoyancy tanks 16 are longitudinally aligned for hydrodynamic purposes. The tanks are fastened to fixed incurvate trays 28, by band 30. The banding can be readily removed and replaced to permit longitudinal adjustment of tank positions in order to achieve a precise trim of vehicle 10.

A pair of horizontal propulsion units 32a, 32b, are affixed to the ends of cross member 24, brace and guard structures 34 are disposed outboard o fthe cage 14 and provide additional support. Units 32 are rigidly mounted with their thrust axes aligned in the longitudinal direction. A pair of vertical propulsion units 36a, 36b, are disposed in an upstanding attitude adjacent the front and rear extremities of spherical container 12. Each is aligned along axis A, which is the center line of the vehicle. The motorpods of both the horizontal and vertical units are identical, each containing a reversible, variable speed, electric motor and reduction gear assembly (not shown). Each unit has a propeller surrounded by a shroud 38, having protective screening 40 (shown only in one place, in FIG. 2) over its end. A tether 42, consisting of an electric power line 42a and a compressed air line 42b, extends down to vehicle 10 from a supporting surface ship, not shown. Power for the electric motors is furnished via the power line 42a, which goes to a junction box 44, and is thence branched out to the individual propulsion units via power connections, not shown.

Spherical container 12 is provided with butterfly valve ports 48 and 50 at its top and bottom, respectively. The compressed air line 42b of the tether to the surface ship is connected to a diver controlled compressed air valve 50 which controls introduction of air into container 12. Valves 46, 48 and 50 give the diver control over the lift force of vehicle 10. By closing top valve 46, opening bottom valve 48, and opening compressed air valve 50 compressed air is introduced into container 12, which forces or "blows" out water and increases the lift. By simultaneous opening top valve 46, and bottom valve 48, air within the container 12 is vented and replaced by water, decreasing the lift. The butterfly valves are chosen to provide sufficient aperture area to enable the gas venting and water blowing to be done rapidly enough for effective response to diver control. A preferred type has a rubber lined body to provide a good seal in an underwater environment. Suitable constructions of such valves are available from Conoflow Corporation, Blackwood, N.J.

The diver positions himself behind and near the bottom of vehicle 10, where an instrument and control panel 52 is provided. Push buttons on the panel enable the diver to control valves 46, 48 and 50. An arrangement of pivotable control handles 54 and 56, further containing rotatable grip elements 58 and 60, provides the diver with four independent hand controls allowing individual control of propulsion units 32a, 32b, 36a, and 36b. Handles 54 and 56 may be individually pivoted about axes C and D. The grip elements 58 and 60 are individually rotatable about grip axes E and F. The thrust of units 32a and 32b are controlled by handles 54 and 56, respectively, and the thrust of units 36a and 36b by rotation of grip elements 58 and 60, respectively. When it is desired to move straight ahead, the diver moves the pair of controls for motor propulsion units 32a, 32b in substantial unison. When it is desired to turn about axis B, the diver operates the controls for these motors differentially. Vertically oriented propulsion units 36a, 36b, are chiefly controlled in unison to assist in raising or lowering the vehicle when approximate balance of lift force and load is achieved. A pair of travel lights 62 (only one is shown) are mounted as part of cage 14 to illuminate the bottom ahead of the vehicle. A work light 64 is mounted to cage 14 to illuminate the area of the load suspension yoke where the load is attached. It will be apparent that the described arrangement of controls places the vehicle flight functions in the diver's hand. This is desirable since he must contend with his own body drag and other handling functions at the same time. Also, positioning the controls at a lower and rear station of the vehicle optimizes safety. The diver can merely let go of the vehicle and be clear of it any time an emergency situation arises. It also allows him to see the load, the bottom, and a short way ahead.

In operation, and referring now to FIG. 4, 4A, and 4B, the vehicle 10 is maneuvered to a position above the load. The load is attached to winch 26 and the vehicle is winched down close to the load. Water is blown out of container 12 until an approximate balance of buoyancy force and load is achieved. This may take several stages of alternately venting gas and blowing water. When approximate neutral buoyancy of the overall vehicle and load system is achieved, the bottom valve is closed. (The reason is to prevent the gas within the sphere from compressing or expanding with changes in depth.) The vehicle and load may be than caused to rise using vertical propulsion units 36a, 36b and flown to any desired horizontal location using horizontal propulsion units 32a, 32b.

Preferably, there is also provided an automatic control which dumps gas from container 12 in the event of accidental loss of the load during an operation. This would avoid the danger of breakaway of the vehicle to the surface under force of its buoyancy. One suitable scheme consists of opening the top and bottom valves 44 and 48 in response to a pressure switch set for a predetermined critical ceiling.

An important feature of the invention is that it provides large lift forces with a structural configuration having inherent restoring forces which resist instability. The use of a spherical type container 12 yields large lift forces. For example, a vehicle of the proportions shown in FIGS. 4, 4A and 4B have a container 12 which displaces 31 cubic feet of water. This yields a lift force of 2,000 pounds, or one ton. The appreciable distance by which the center of buoyancy is located above the center of gravity is the primary restoring force. As mentioned, this relationship is principally due to a provision of fixed buoyancy tanks 16 at the top of the vehicle. Use of a generally spherically configured container avoids nonhomogenities of forces configured container avoids nonhomogeneities of forces tilts in any direction. Suspension of the load from pivot points along the axis of cross member 24 cause the load force to act at the center of the spherical container where it will always be within moment stability recovery limits.

While the invention has been illustrated with a tether to a supporting ship, it should be understood that it could be made independent of a tether by carrying batteries for the propulsion units, and carrying compressed air or a suitable gas generator, a source of gases for introduction into container 12.

Obviously many modifications and variations of the present invention are possible in the light of the above teachings.

What is claimed is:
1. A diver's work vehicle for use in raising an object from the floor of a body of water and generally laterally transporting same to another location for lowering to said floor, said vehicle comprising:
  (a) a generally spherical container,
  (b) a support cage affixed to and disposed about said spherical container, and defining a vehicle longitudinal axis,
  (c) a pair of longitudinally aligned cylindrical buoyancy tanks affixed to the top of said support cage and adapted to provide an uprighting buoyancy force defining a normally vertical axis through the center of the spherical container,
  (d) a load suspension yoke pivotally connected to the spherical container about an axis through its center and perpendicular to both the longitudinal and vertical axes of the vehicle,
  (e) said spherical container being provided with a diver controlled gas venting port valve at the top thereof and a diver controlled water blow port valve at the bottom thereof,
  (f) diver controlled means for introducing compressed gas into the interior of the spherical container, and
  (g) first and second longitudinally acting propulsion means affixed to said support cage at one and the other sides of the vehicle, said first and second propulsion means being adapted to provide independently variable thrust under diver control.
2. Apparatus in accordance with claim 1, and
  (h) first and second vertically acting propulsion means affixed to said support cage along the vehicle centerline and adjacent the front and rear peripheries, respectively, of the spherical container.

3. Apparatus in accordance with claim 1, wherein
(i) said generally spherical container has bilaterally symmetrical truncated sides,
(j) said first and second longitudinally acting propulsion means being disposed adjacent to the flat circular faces of the truncated sides.

4. Apparatus in accordance with claim 2:
(k) said first and second longitudinally acting propulsion means and said first and second vertically acting propulsion means each comprising a reversible electromotor drivingly connected to a propeller.

References Cited

UNITED STATES PATENTS 2,981,073  4/1961  Robinson _____ 61—69
3,356,055  12/1967  Link _____ 114—16

TRYGVE M. BLIX, *Primary Examiner.*

U.S. Cl. X.R.

61—69; 114—50